(12) United States Patent
Narumi et al.

(10) Patent No.: US 12,333,873 B2
(45) Date of Patent: Jun. 17, 2025

(54) LOCKING DEVICE, MOVABLE BODY, AND SYSTEM

(71) Applicant: KABUSHIKI KAISHA TOKAI RIKA DENKI SEISAKUSHO, Aichi (JP)

(72) Inventors: Kenji Narumi, Aichi (JP); Takakazu Sengoku, Aichi (JP); Tomomi Imai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 18/023,524

(22) PCT Filed: Aug. 3, 2021

(86) PCT No.: PCT/JP2021/028808
§ 371 (c)(1),
(2) Date: Feb. 27, 2023

(87) PCT Pub. No.: WO2022/091513
PCT Pub. Date: May 5, 2022

(65) Prior Publication Data
US 2023/0360452 A1 Nov. 9, 2023

(30) Foreign Application Priority Data
Oct. 29, 2020 (JP) .................. 2020-181427

(51) Int. Cl.
*G07C 9/00* (2020.01)
*G06Q 10/0836* (2023.01)

(52) U.S. Cl.
CPC ..... *G07C 9/00309* (2013.01); *G06Q 10/0836* (2013.01); *G07C 2009/00317* (2013.01)

(58) Field of Classification Search
CPC ..... E05B 73/00; E05B 49/00; G07C 9/00309; G07C 2009/00444; G07C 2009/0092; G06Q 10/08
See application file for complete search history.

(56) References Cited

U.S. PATENT DOCUMENTS

2004/0199284 A1* 10/2004 Hara ................. G07F 17/13
700/215
2016/0374494 A1* 12/2016 Geng .................. A47G 29/16
232/17

(Continued)

FOREIGN PATENT DOCUMENTS

| CN | 210864913 | 6/2020 |
| JP | 2019-80626 A | 5/2019 |
| JP | 2020-111990 A | 7/2020 |

OTHER PUBLICATIONS

International Search Report issued in International Bureau of WIPO Patent Application No. PCT/JP2021/028808, dated Sep. 14, 2021, along with an English translation thereof.

*Primary Examiner* — Mirza F Alam
(74) *Attorney, Agent, or Firm* — GREENBLUM & BERNSTEIN, P.L.C.

(57) ABSTRACT

There is provided a locking device including: a plurality of locking sections for fixing goods; a control section configured to control locking and unlocking of the locking sections; and a fixing space shared for a plurality of the goods that can be fixed to the plurality of locking sections.

2 Claims, 7 Drawing Sheets

(56) References Cited

U.S. PATENT DOCUMENTS

| | | | |
|---|---|---|---|
| 2018/0159835 A1* | 6/2018 | Iida | G07C 9/00174 |
| 2019/0213812 A1* | 7/2019 | Burns | G07C 9/00309 |
| 2020/0224466 A1* | 7/2020 | Kamata | G07C 9/00571 |
| 2021/0012600 A1* | 1/2021 | Imai | G06Q 10/0833 |

\* cited by examiner

LOCKING DEVICE, MOVABLE BODY, AND SYSTEM

TECHNICAL FIELD

The present invention relates to a locking device, a movable body, and a system.

BACKGROUND ART

Recently, needs for deposit and delivery of goods are increasing. Furthermore, a mechanism for making deposit and delivery of goods efficient is proposed. For example, Patent Literature 1 discloses a delivery box that enables receipt of goods even when a recipient is not present.

CITATION LIST

Patent Literature

Patent Literature 1: JP 2019-80626 A

SUMMARY OF INVENTION

Technical Problem

However, the delivery box disclosed in Patent Literature 1 has a space of an invariable size for storing goods, and has difficulty in storing goods that exceed the size of this space.

Hence, the present invention has been made in view of the above problem, and an object of the present invention is to flexibly temporarily store a plurality of goods.

To solve the above-described problems, according to an aspect of the present invention, there is provided a locking device comprising: a plurality of locking sections for fixing goods; a control section configured to control locking and unlocking of the locking sections; and a fixing space shared for a plurality of the goods that can be fixed to the plurality of locking sections.

To solve the above-described problem, according to another aspect of the present invention, there is provided a movable body comprising: a plurality of locking sections for fixing goods; a control section configured to control locking and unlocking of the locking sections; and a fixing space shared for a plurality of the goods that can be fixed to the plurality of locking sections.

To solve the above-described problem, according to another aspect of the present invention, there is provided a system comprising: a locking device; and a mobile terminal carried by a user, the locking device includes a plurality of locking sections for fixing goods, a control section configured to control locking and unlocking of the locking sections, a first wireless communication section configured to transmit the key information used to unlock the locking sections to the mobile terminal carried by the user who has fixed the goods by using the locking sections, and a fixing space shared for a plurality of goods that can be fixed to the plurality of locking sections, the mobile terminal includes a second wireless communication section configured to receive the key information, and the second wireless communication section transmits the key information to the locking device based on an unlocking operation of the user.

Advantageous Effects of Invention

As described above, according to the present invention, it is possible to flexibly temporarily store a plurality of goods.

DESCRIPTION OF EMBODIMENTS

Figure 1:
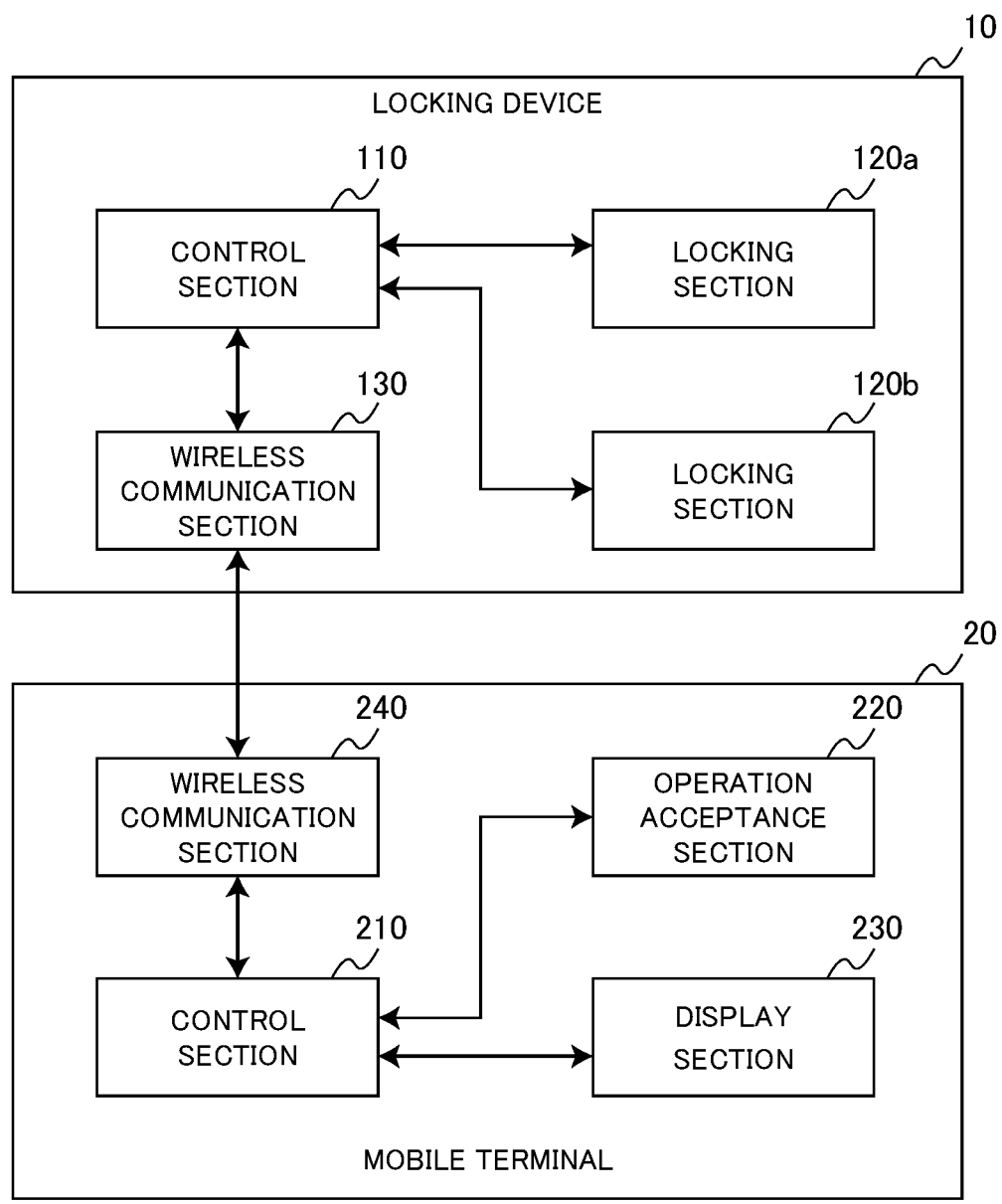
FIG. 1 is a diagram illustrating a configuration example of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1. System Configuration Example

First, a configuration example of a system 1 according to an embodiment of the present invention will be described first. FIG. 1 is a view illustrating the configuration example of the system 1 according to the present embodiment.

As illustrated in FIG. 1, the system 1 according to the present embodiment may include a locking device 10 and a mobile terminal 20.

(Locking Device 10)

The locking device 10 according to the present embodiment is a device for storing deposited goods. As illustrated in FIG. 1, the locking device 10 according to the present embodiment may include a control section 110, a plurality of locking sections 120, and a wireless communication section 130.

(Control Section 110)

The control section 110 according to the present embodiment controls each component included in the locking device 10.

For example, the control section 110 according to the present embodiment controls locking and unlocking of the plurality of locking sections 120 included in the locking device 10.

Furthermore, for example, the control section 110 according to the present embodiment may control transmission of key information from the wireless communication section 130.

In this regard, the above key information may be information used by the control section 110 to unlock the locking sections 120. As the key information, for example, a password, a hash function, or the like may be used.

In an example, the control section 110 according to the present embodiment may control the wireless communication section 130 to transmit key information to the mobile terminal 20 owned by a user who has fixed the goods by using the locking section 120.

In this case, the control section 110 according to the present embodiment may perform authentication based on information driving from the key information transmitted from the mobile terminal 20, and perform control to unlock the locking section 120 associated with the key information when the authentication succeeds.

For example, the control section 110 may cause the wireless communication section 130 to transmit to the mobile terminal 20 a request signal that is a signal for requesting a password, and perform authentication based on the password included in a response signal that is transmitted by the mobile terminal 20 as a response to the request signal.

Furthermore, for example, the control section 110 may cause the wireless communication section 130 to transmit to the mobile terminal 20 a request signal that is a signal for requesting an arithmetic operation result that uses a password and a random number, and that includes the random number, and perform authentication based on the arithmetic operation result included in a response signal transmitted by the mobile terminal 20 as a response to the request signal.

Note that the above-mentioned control is merely an example, and functions of the control section 110 according to the present embodiment can be flexibly changed according to an application range of the system 1.

For example, the case has been described above where key information and information related to authentication that uses the key information are directly transmitted and received between the wireless communication section 130 and the mobile terminal 20 based on control of the control section 110.

The control section 110 according to the present embodiment may perform control to indirectly distribute the key information to the mobile terminal 20 via a separate device such as a server, and collect information related to the authentication from the mobile terminal 20 via the separate device.

Details of functions of the control section 110 according to the present embodiment will be separately described.

Furthermore, the functions of the control section 110 according to the present embodiment are realized by a processor such as a CPU.

(Locking Section 120)

The locking section 120 according to the present embodiment is a component for fixing goods. The locking section 120 according to the present embodiment may be an electric lock that is locked and unlocked according to control of the control section 110.

Note that one of features of the locking device 10 according to the present embodiment is that the locking device 10 includes the plurality of locking sections 120, and a fixing space 140 that is shared for a plurality of goods that can be fixed to the plurality of locking sections 120.

Note that, although FIG. 1 illustrates a case where the locking device 10 according to the present embodiment includes two locking sections 120a and 120b, the number of the locking sections 120 according to the present embodiment is not limited to this example.

The locking device 10 according to the present embodiment only needs to include the at least two or more multiple locking sections 120, and the number of locking sections 120 is determined according to a size of the above fixing space 140 or the like.

According to the above configuration, it is possible to temporarily store a plurality of goods flexibly in a secure manner.

(Wireless Communication Section 130)

The wireless communication section 130 according to the present embodiment performs wireless communication with the mobile terminal 20 carried by the user.

In an example, the wireless communication section 130 according to the present embodiment may transmit key information used to unlock the locking section 120 to the mobile terminal 20 according to control of the control section 110.

Standards used for wireless communication of the wireless communication section 130 include, for example, Bluetooth Low Energy (BLE (registered trademark)) and Wi-Fi (registered trademark).

A functional configuration example of the locking device 10 according to the present embodiment has been described above. Note that the above functional configuration described with reference to FIG. 1 is merely an example, and the functional configuration of the locking device 10 according to the present embodiment is flexibly changed according to the application range of the system 1.

In an example, the control section 110 according to the present embodiment may be included in a server installed on a cloud, and control the locking sections 120 that are included in a locally installed device, and the wireless communication section 130.

(Mobile Terminal 20)

The mobile terminal 20 according to the present embodiment is an information processing device carried by the user. The mobile terminal 20 according to the present embodiment may be, for example, a smartphone, a tablet, a wearable terminal, and the like.

As illustrated in FIG. 1, the mobile terminal 20 according to the present embodiment may include a control section 210, an operation acceptance section 220, a display section 230, and a wireless communication section 240.

(Control Section 210)

The control section 210 according to the present embodiment controls each component included in the mobile terminal 20.

For example, the control section 210 according to the present embodiment may cause the wireless communication section 240 to transmit key information to the locking device 10 based on a user's unlocking operation detected by the operation acceptance section 220.

Note that the above-mentioned control is merely an example, and functions of the control section 210 according to the present embodiment can be flexibly changed according to the application range of the system 1.

The functions of the control section 210 according to the present embodiment are realized by a processor such as a CPU.

(Operation Acceptance Section 220)

The operation acceptance section 220 according to the present embodiment accepts user's various operations.

Hence, the operation acceptance section 220 according to the present embodiment includes various input devices such as buttons, switches, a keyboard, and a touch panel.

(Display Section 230)

The display section 230 according to the present embodiment displays various pieces of visual information according to control of the control section 210.

Hence, the display section 230 according to the present embodiment includes a display device such as a display.

(Wireless Communication Section 240)

The wireless communication section 240 according to the present embodiment performs wireless communication with the locking device 10.

In an example, the wireless communication section 240 according to the present embodiment may transmit key information to the locking device 10 based on a user's unlocking operation.

A functional configuration example of the mobile terminal 20 according to the present embodiment has been described above. Note that the above functional configuration described with reference to FIG. 1 is merely an example, and the functional configuration of the mobile terminal 20 according to the present embodiment is flexibly changed according to the application range of the system 1.

In an example, the mobile terminal 20 according to the present embodiment may further include components that realize a dialogue between the user and an agent function using a voice. For example, the mobile terminal 20 according to the present embodiment may further include a voice input section for collecting user's voices, and a voice output section for outputting artificial voices.

1.2. Application Example

Next, a specific example of the application example of the system 1 according to the present embodiment will be described.

As described above, recently, needs for deposit and delivery of goods are increasing. Hence, many devices for temporarily storing goods are developed.

However, the above devices generally include storage spaces having fixed sizes.

Therefore, in a case where a luggage that a user needs to deposit exceeds the size of the storage space, it is difficult to use the above device.

Furthermore, the number of storage spaces at which the above devices are installed is limited, and therefore, in a case where all storage spaces are used, the user cannot newly deposit goods.

The above restriction may cause deterioration of device use efficiency, and deterioration of user friendliness.

A technical idea of the present invention has been conceived focusing on the above point, and enables more flexible temporary storage of a plurality of goods.

Hence, one of features of the locking device 10 according to the present embodiment is that the locking device 10 includes the plurality of locking sections 120 for fixing goods, and the fixing space 140 that is shared for a plurality of goods that can be fixed to the plurality of locking sections 120.

First, a case where the user temporarily fixes the goods by using the locking device 10 according to the present embodiment will be described as an example. In this case, the goods fixed by using the locking section 120 may be temporary deposited goods.

Figure 2:
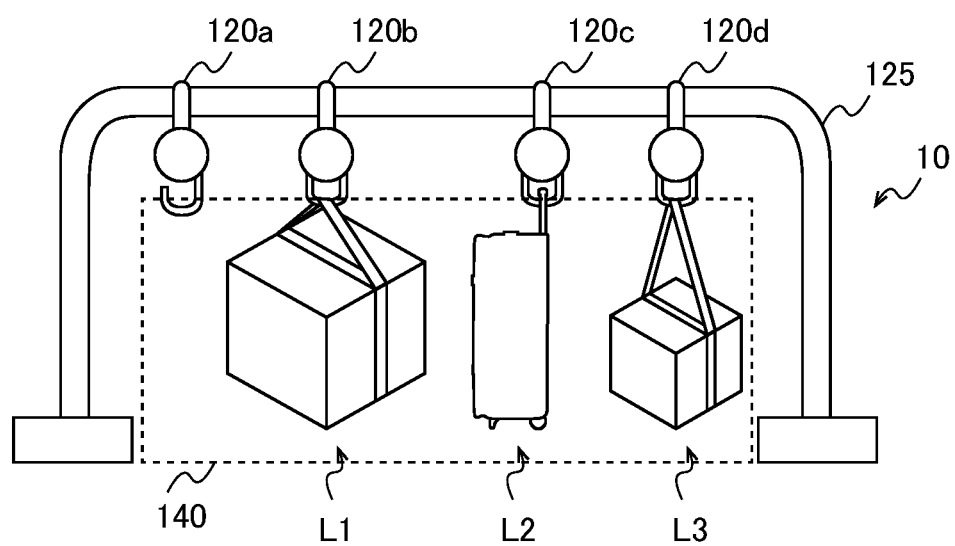
FIG. 2 is a view for describing temporary fixation of deposited goods by a locking device 10 according to the embodiment.

FIG. 2 is a view for describing temporary fixation of deposited goods by the locking device 10 according to the present embodiment.

The locking device 10 according to the present embodiment may be fixedly installed at arbitrary places such as transportation facilities such as stations and airports, commercial facilities such as shopping modes, and roads.

In a case of an example illustrated in FIG. 2, the locking device 10 according to the present embodiment includes a plurality of locking sections 120a to 120d that are connected to a pole 125 connected to weights, and the fixing space 140 that is shared for a plurality of goods that can be fixed to the plurality of locking sections 120a to 120d.

In the case of the example illustrated in FIG. 2, the fixing space 140 is shared for deposited goods L1 fixed to the locking section 120b, deposited goods L2 fixed to the locking section 120c, and deposited goods L3 fixed to the locking section 120c. Furthermore, the deposited goods L1 to L3 are possessions deposited by respectively different users.

Thus, the locking device 10 according to the present embodiment may not be provided with partitioned spaces for storing deposited goods L per user, but may be provided with the fixing space 140 that is shared for a plurality of the deposited goods L deposited by a plurality of users.

Even in this case, by fixing the respective deposited goods L using the plurality of locking sections 120, it is possible to store the respective deposited goods L in a secure manner.

Furthermore, according to the above configuration, it is possible to flexibly change a composition related to sizes and the number of the deposited goods L within a range permitted by the size of the fixing space 140.

Note that the locking device 10 may include the plurality of locking sections 120 of various large and small sizes to meet the sizes of the various deposited goods L. Furthermore, the plurality of locking sections 120 may be provided slidably on the pole 125 to enable adjustment of a place to dispose the deposited goods L.

Consequently, compared to a device such as general lockers, it is possible to increase the number of simultaneously available users, and increase the number of the deposited goods L that are simultaneously deposited.

The case where the locking device 10 according to the present embodiment is fixedly installed and used to temporarily fix the deposited goods L of the user has been exemplified above with reference to FIG. 2.

Next, a flow of an operation of the locking device 10 in a case where the deposited goods L are temporarily fixed will be described with reference to FIG. 3.

Figure 3:
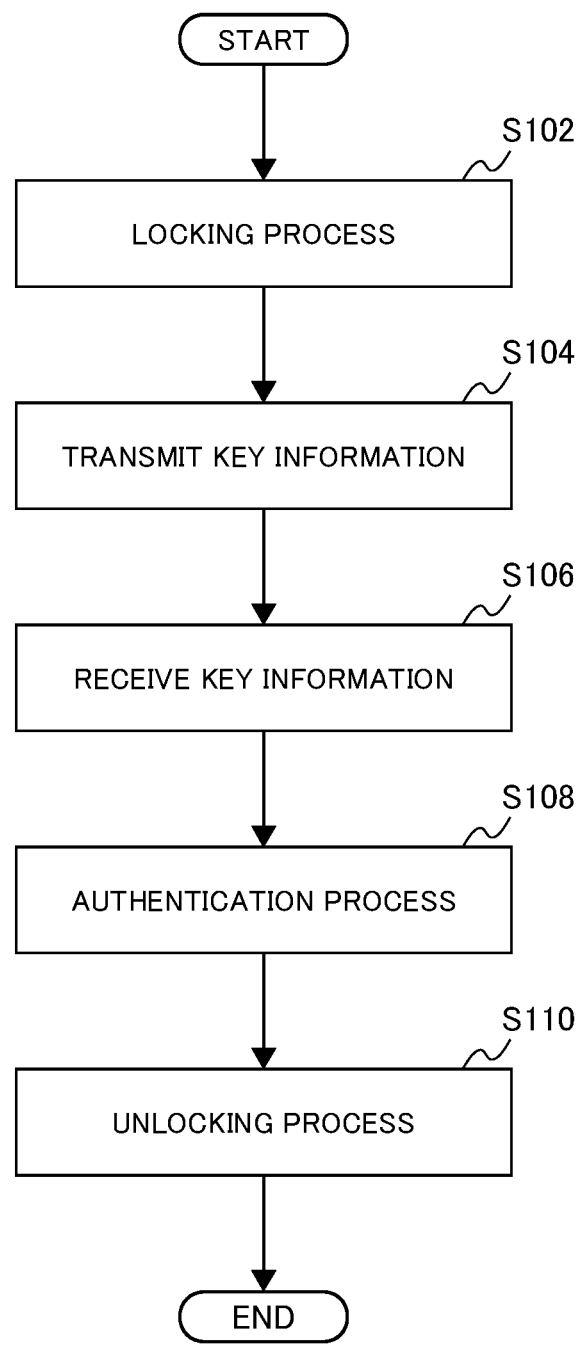
FIG. 3 is a flowchart illustrating an example of a flow of an operation of the locking device 10 in a case where deposited goods L are temporarily fixed according to the embodiment.

FIG. 3 is a flowchart illustrating an example of the flow of the operation of the locking device 10 in a case where the deposited goods L are temporarily fixed.

In a case of the example illustrated in FIG. 3, the control section 110 of the locking device 10 first performs a process of locking the corresponding locking section 120 based on a user's operation of fixing the deposited goods L to the locking section 120 (S102).

The user's operation in step S102 may be performed via the operation acceptance section 220 of the mobile terminal 20 carried by the user, or may be performed via an operation acceptance section included in the locking device 10.

Next, the control section 110 of the locking device 10 generates key information associated with the locking section 120 locked in step S102, and causes the wireless communication section 130 to transmit the key information to the mobile terminal 20 carried by the user (S104).

Subsequently, the user executes an unlocking operation of instructing unlocking of the locking section 120 by using the operation acceptance section 220 of the mobile terminal 20 to pick up the deposited goods L.

Based on the above unlocking operation, the control section 210 of the mobile terminal 20 causes the wireless communication section 130 to transmit the key information received in step S104.

Furthermore, the wireless communication section 130 of the locking device 10 receives the key information transmitted from the mobile terminal 20 (S106).

Next, the control section 110 of the locking device 10 performs an authentication process based on the key information received by the wireless communication section 130 in step S106 (S108).

In this regard, in case where the authentication succeeds, the control section 110 performs a process of unlocking the corresponding locking section 120 (S110).

The flow of the operation of the locking device 10 in a case where the deposited goods L are temporarily fixed has been described above citing the example.

However, the application range of the locking device 10 according to the present embodiment is not limited to this example.

For example, goods fixed by using the locking section 120 according to the present embodiment may be pickup goods that the user wishes to be picked up.

Furthermore, in this case, the locking device 10 according to the present embodiment may be mounted on a movable body 30 such as a vehicle.

Figure 4:
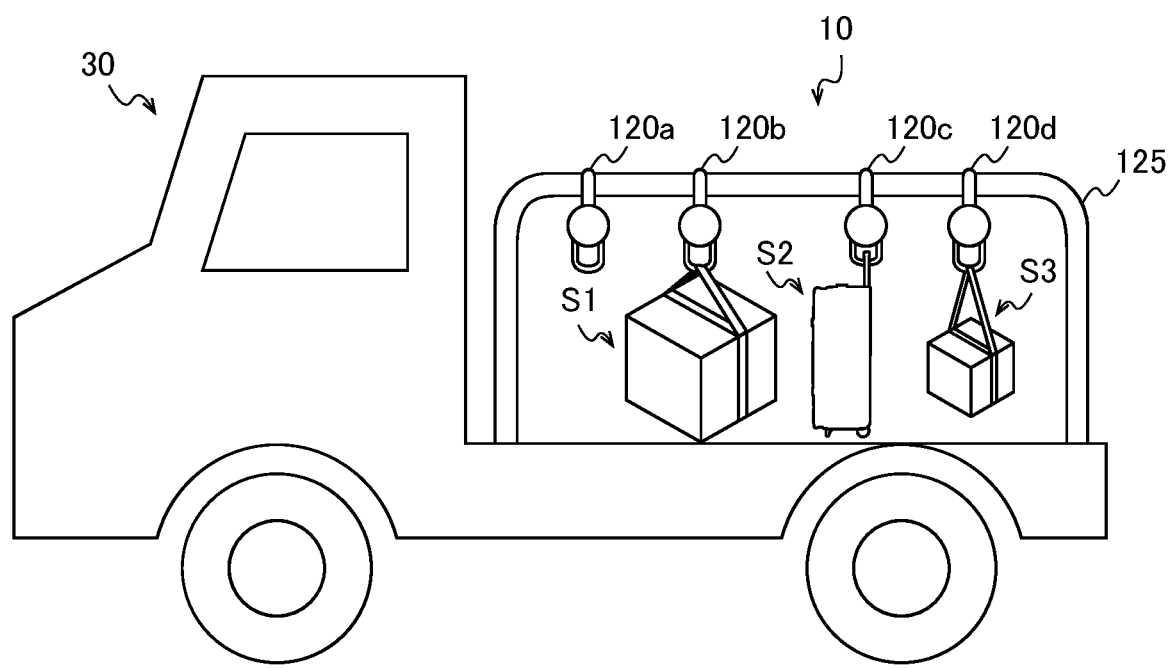
FIG. 4 is a view for describing temporary fixation of pickup goods by the locking device 10 according to the embodiment.

FIG. 4 is a view for describing temporary fixation of pickup goods by the locking device 10 according to the present embodiment.

In a case of an example illustrated in FIG. 4, the locking device 10 according to the present embodiment is disposed on a loading platform of the movable body 30 in such a way that the user can access the locking device 10.

The user temporarily stops the movable body 30 that is running near a transportation facility such as a station or an airport, near a commercial facility such as a shopping mode, or on a road, and fixes the pickup goods S to the locking section 120.

In the case of the example illustrated in FIG. 4, pickup goods S1 to S3 are fixed to the locking sections 120*b* to 120*d*, respectively.

Note that, in a case where the locking device 10 is mounted on a movable body as illustrated in FIG. 4, the control section 110 may control driving of the movable body 30.

In this case, the control section 110 according to the present embodiment may temporarily stop the movable body 30 when detecting a user's gesture indicating a wish to stop the movable body 30, and drive the movable body 30 toward a destination (e.g., a delivery center) again after the user finishes fixing the pickup goods S.

In this case, the control section 110 according to the present embodiment can cause the movable body 30 to run on a route specified in advance to collect the pickup goods S, and perform control to cause the movable body 30 to go for a destination after a specified time passes or when all of the locking sections 120 are in use.

Furthermore, the control section 110 according to the present embodiment may perform control to unlock all of the plurality of locking sections 120 when a specified condition set in advance is detected.

The above specified condition includes, for example, an arrival of the movable body 30 at the destination. That is, when detecting that the movable body 30 has arrived at the destination such as a delivery center, the control section 110 according to the present embodiment may perform control to unlock all of the plurality of locking sections 120.

According to the above control, it is possible to unfix the plurality of pickup goods S without performing unlocking work on the locking sections 120 one by one at the delivery center, and improve work efficiency.

Note that the control section 110 may detect the arrival of the movable body 30 at the destination based on, for example, position information obtained by a reception device that receives a signal from a Global Navigation Satellite System (GNSS).

On the other hand, when the movable body 30 is driven by a person, the control section 110 may detect the arrival of the movable body 30 at the destination based on a driver's input operation.

The case where the locking device 10 according to the present embodiment is mounted on the movable body 30, and the pickup goods S is temporarily fixed has been exemplified above with reference to FIG. 4.

Note that the system 1 according to the present embodiment may not necessarily include the mobile terminal 20 in this case.

On the other hand, in a case where the control section 110 controls the movable body 30, and causes the movable body 30 to go for a place of a user who requests pickup of the pickup goods S, or causes the movable body 30 to go for a pickup place designated by a user who has fixed the pickup goods S, the mobile terminal 20 may be used to designate the place.

Furthermore, in a case where the above control is performed, the control section 110 may be included in the server, and control the locking sections 120 mounted on the movable body 30, and a separate driving control section.

Next, a flow of an operation of the locking device 10 in a case where the pickup goods S are temporarily fixed will be described with reference to FIG. 5.

Figure 5:
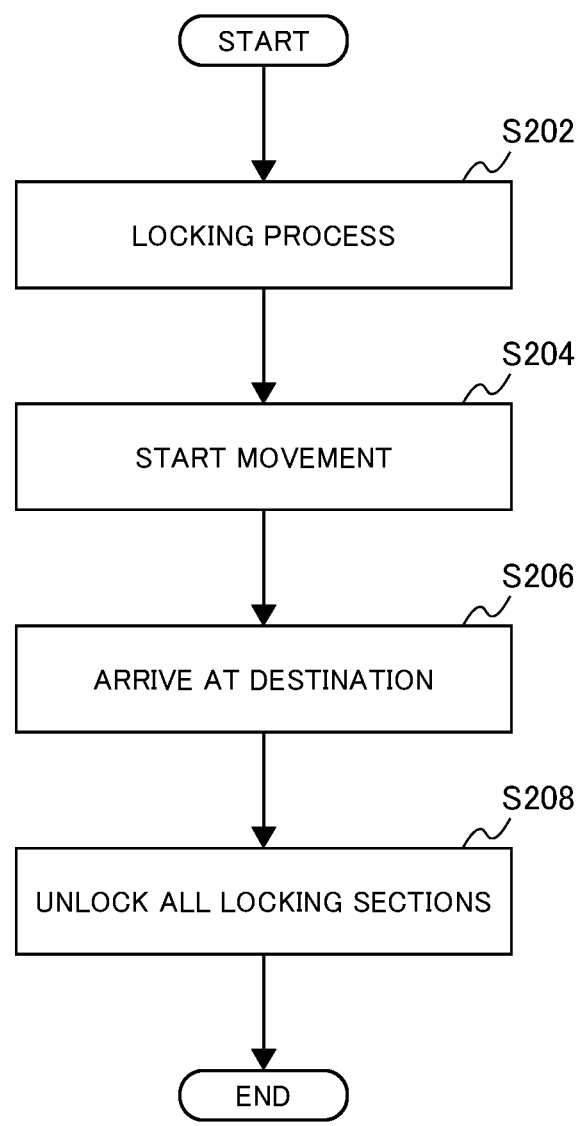
FIG. 5 is a flowchart illustrating an example of a flow of an operation of the locking device 10 in a case where pickup goods S is temporarily fixed according to the embodiment.

FIG. 5 is a flowchart illustrating an example of the flow of the operation of the locking device 10 in a case where the pickup goods S are temporarily fixed.

Hereinafter, a case will be exemplified below where the control section 110 is mounted on the movable body 30 together with the plurality of locking sections 120, and controls driving of the movable body 30.

In a case of the example illustrated in FIG. 5, the control section 110 first performs a process of locking the corresponding locking section 120 based on a user's operation of fixing the pickup goods S to the locking section 120 (S202).

After the process in step S202, the control section 110 starts moving the movable body 30 (S204).

Note that the processes in steps S202 and S204 may be executed a plurality of times.

Subsequently, when detecting an arrival of the movable body 30 at a destination such as a delivery center (S206), the control section 110 executes a process of unlocking all of the locking sections 120 (S208).

The flow of the operation of the locking device 10 in a case where the pickup goods S are temporarily fixed has been described above citing the example.

Next, a case where will be exemplified where goods to be fixed by using the locking section 120 according to the present embodiment are a product that the user wishes other users to purchase.

The system 1 according to the present embodiment can be applied to unattended sales of the product.

Figure 6:
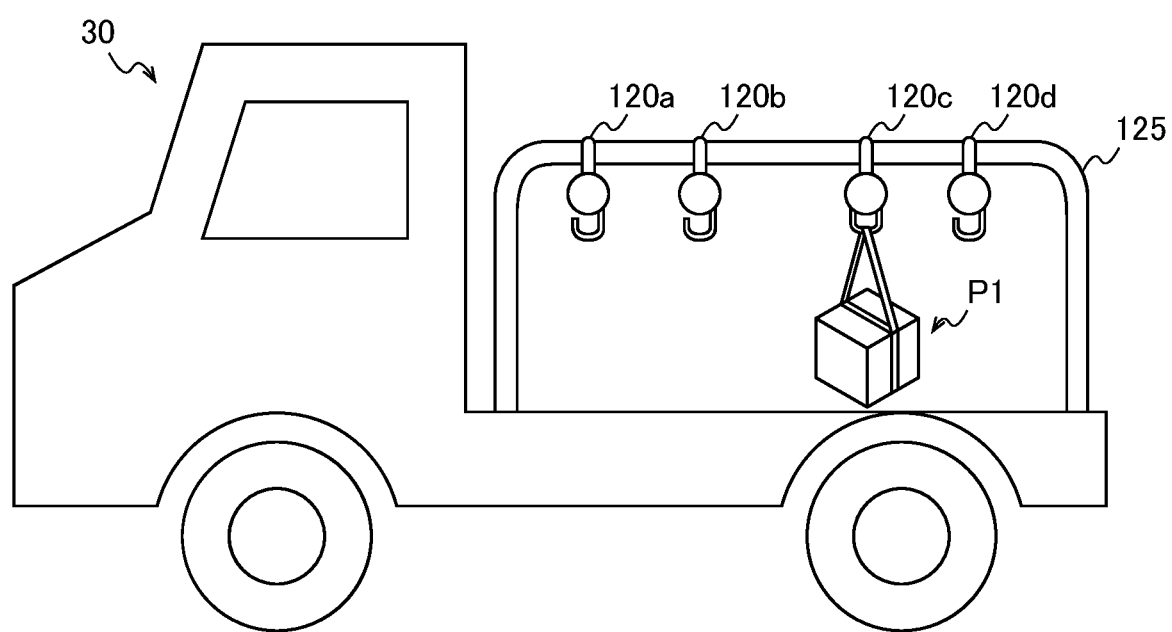
FIG. 6 is a view for describing temporary fixation of a product by the locking device 10 according to the embodiment.

FIG. 6 is a view for describing temporary fixation of a product by the locking device 10 according to the present embodiment.

In a case of an example illustrated in FIG. 6, the locking device 10 according to the present embodiment can be disposed on a platform of the movable body 30 such that the user can access the locking device 10 similar to the example illustrated in FIG. 4.

A user who wishes to fix a product temporarily stops the movable body 30 that is running near a transportation facility such as a station and an airport, near a commercial facility such as a shopping mode, or on a road, and fix the pickup goods S to the locking section 120.

FIG. 6 illustrates a product P1 fixed to the locking section 120c by a certain user.

In this case, another user may temporarily stop the movable body 30, pay an amount of money set to the product P1, unlock the locking section 120c, and be allowed to purchase the product P1.

Furthermore, the another user can also fix the own product P to the locking section 120a, 120b, or 120d that is not used.

Consequently, the system 1 according to the present embodiment can realize deposit and sales of the product P without requiring manpower.

Accordingly, it is possible to automate, for example, shipping of the product P from a producer to delivery and sales of the product P to a remote place, and provide advantages for both of a user who wishes to sell the product P and a user who wishes to purchase the product P.

Next, a flow of an operation of the locking device 10 in a case where the product P is temporarily fixed will be described with reference to FIG. 7.

Figure 7:
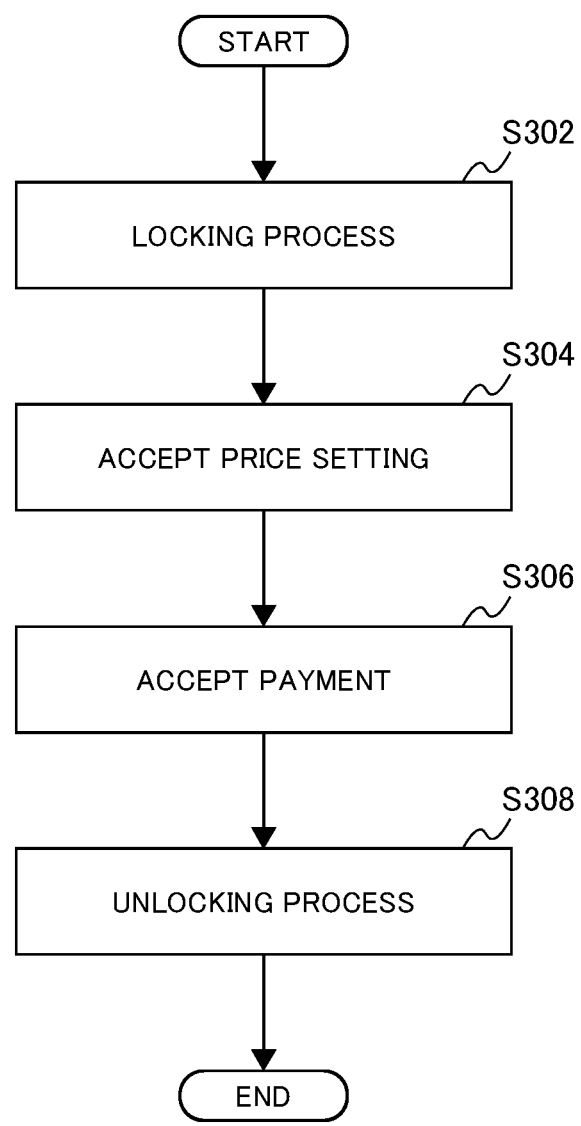
FIG. 7 is a flowchart illustrating an example of a flow of an operation of the locking device 10 in a case where a product P is temporarily fixed according to the embodiment.

FIG. 7 is a flowchart illustrating an example of the flow of the operation of the locking device 10 in a case where the product P is temporarily fixed.

In a case of the example illustrated in FIG. 7, the control section 110 first performs a process of unlocking the corresponding locking section 120 based on a user's operation of fixing the product P to the locking section 120 (S302).

Next, the control section 110 accepts a price setting of the product P by a user who has fixed the product P to the locking section 120 in step S302 (S304).

Note that the price setting of the product P by the user in step S304 may be performed by using the operation acceptance section 220 of the mobile terminal 20, or may be performed by using the operation acceptance section included in the locking device 10.

Subsequently, the control section 110 accepts payment of a user who wishes to purchase the product P (S306).

The user's payment in step S306 may be performed by using the operation acceptance section 220 of the mobile terminal 20.

On the other hand, the user's payment in step S306 may be performed using an IC card that supports payment with electronic money. In this case, the wireless communication section 130 of the locking device 10 may perform wireless communication that conforms to Near Field Communication (NFC).

Next, the control section 110 performs control to unlock the corresponding locking section 120 based on a fact that payment of the product P fixed to the locking section 120 has been completed (S308).

2. Supplementary Explanation

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, the above embodiment has exemplified the case where the locking device 10 is fixedly set in a case where deposited goods are temporarily fixed, and is mounted on the movable body 30 in a case where pickup goods or a product is temporarily fixed.

However, the above case is merely an example. The locking device 10 may be mounted on the movable body 30 in a case where deposited goods are temporarily fixed, or may be fixedly installed in a case where pickup goods or a product is temporarily fixed.

Furthermore, although, for example, the above embodiment has cited goods such as deposited goods, pickup goods, and a product as an object to be fixed to the locking device 10, the object to be fixed to the locking device 10 may be, for example, a person or a pet.

In this case, the locking section 120 of the locking device 10 may be used to unfix, for example, a seat belt. According to this configuration, it is possible to safely escort, to destinations, for example, subjects such as infants, elderly people, and pets that have difficulty in operating seat belts, and subjects that are likely to unfasten seat belts in inappropriate scenes.

Furthermore, a series of processes of each device described in this description may be realized by using one of software, hardware, and a combination of the software and the hardware. Programs that configure the software are stored in advance in, for example, recording media (non-transitory media) provided inside or outside each device. Furthermore, each program is read on an RAM when, for example, executed by a computer, and is executed by a processor such as a CPU. The above recording media are, for example, a magnetic disk, an optical disk, a magneto-optical disk, a flash memory and the like. Furthermore, the above computer programs may be distributed via, for example, a network without using the recording media.

REFERENCE SIGNS LIST 10 locking device
110 control section
120 locking section
130 wireless communication section
140 fixing space
20 mobile terminal
210 control section
220 operation acceptance section
230 display section
240 wireless communication section
30 movable body

The invention claimed is:

1. A system comprising:
a locking device; and
a mobile terminal carried by a user,
the locking device includes
a plurality of locking sections for fixing goods,
a control section configured to control locking and unlocking of the locking sections,
a first wireless communication section configured to transmit the key information used to unlock the locking sections to the mobile terminal carried by the user who has fixed the goods by using the locking sections, and
a fixing space shared for a plurality of goods that is configured to be fixed to the plurality of locking sections,
the mobile terminal includes a second wireless communication section configured to receive the key information, and
the second wireless communication section transmits the key information to the locking device based on an unlocking operation of the user, wherein the goods fixed by using the locking section are pickup goods that a user wishes to be picked up.

2. A system comprising:
a locking device; and
a mobile terminal carried by a user,
the locking device includes
a plurality of locking sections for fixing goods,
a control section configured to control locking and unlocking of the locking sections,
a first wireless communication section configured to transmit the key information used to unlock the locking sections to the mobile terminal carried by the user who has fixed the goods by using the locking sections, and
a fixing space shared for a plurality of goods that is configured to be fixed to the plurality of locking sections,
the mobile terminal includes a second wireless communication section configured to receive the key information, and
the second wireless communication section transmits the key information to the locking device based on an unlocking operation of the user,
wherein the goods fixed by using the locking section are a product that a user wishes another user to purchase.

* * * * *